United States Patent
Solet et al.

(10) Patent No.: US 6,820,650 B2
(45) Date of Patent: Nov. 23, 2004

(54) SOLENOID VALVE WITH ELECTROMAGNETIC AND PNEUMATIC SWITCHING SUBASSEMBLIES

(75) Inventors: Daniel Solet, Saint Sauveur Levasville (FR); Bernard Courpron, Nogent le Roi (FR); Richard Vandamme, Mainvilliers (FR)

(73) Assignee: ASCO Joucomatic (FR)

( * ) Notice: Subject to any disclaimer, the term of this patent is extended or adjusted under 35 U.S.C. 154(b) by 9 days.

(21) Appl. No.: 10/338,488

(22) Filed: Jan. 9, 2003

(65) Prior Publication Data

US 2003/0150499 A1 Aug. 14, 2003

(30) Foreign Application Priority Data

Jan. 15, 2002 (FR) .............................. 02 00437

(51) Int. Cl.[7] .............................. F15B 13/044
(52) U.S. Cl. .................. 137/625.65; 137/315.03; 251/129.03
(58) Field of Search ................. 137/315.03, 625.65; 251/129.03

(56) References Cited

U.S. PATENT DOCUMENTS 4,552,179 A 11/1985 Tarusawa et al.
4,739,966 A * 4/1988 Lepine et al. .......... 137/625.65
5,356,111 A * 10/1994 Bottacini ................ 137/625.65

FOREIGN PATENT DOCUMENTS

| FR | 2267009 | 10/1975 |
| FR | 2795494 | 11/2000 |

* cited by examiner

Primary Examiner—Gerald A. Michalsky
(74) Attorney, Agent, or Firm—Connolly Bove Lodge & Hutz LLP

(57) ABSTRACT

A solenoid valve has an electromagnet subassembly and a pneumatic switching subassembly. A valve plug is mechanically associated with the electromagnet subassembly, the pneumatic switching subassembly includes a body enclosing the valve plug trapped between two sealing seating facing each other. The movement of the valve plug is controlled firstly by a spring located in a mobile core of the electromagnet subassembly through a pusher, and secondly by a means that forces the valve plug into contact on the upper seating of the pneumatic switching subassembly when the electromagnet is energized. The electromagnetic subassembly has four cylindrical pins at its assembly plane on the pneumatic switching subassembly, each cylindrical pin being provided with a transverse cavity formed on the generating line of the pin and terminating with a frustum of a sphere. The pneumatic switching subassembly includes four cylindrical cavities as its assembly plane with the electromagnet subassembly.

13 Claims, 5 Drawing Sheets

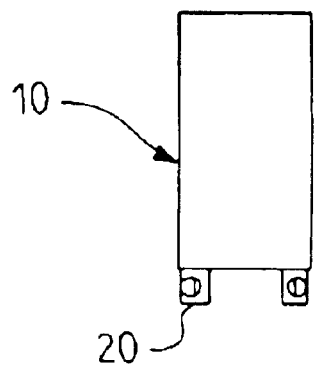
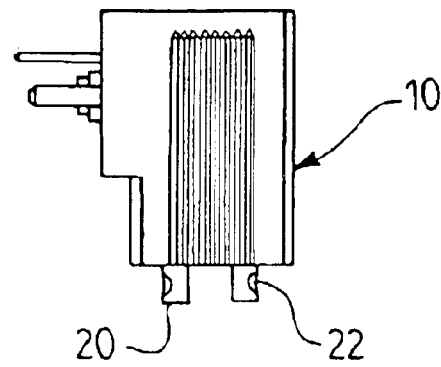
FIG.1a  FIG.1b
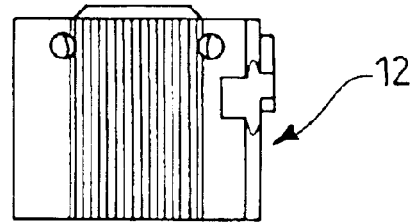
FIG.2a
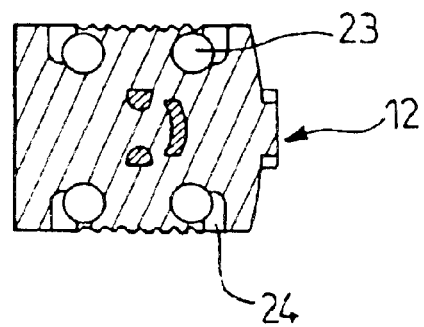
FIG.2b

SOLENOID VALVE WITH ELECTROMAGNETIC AND PNEUMATIC SWITCHING SUBASSEMBLIES

FIELD OF THE INVENTION

The present invention relates to improvements made to solenoid valves.

BACKGROUND OF THE INVENTION

It is more particularly applicable to solenoid valves comprising an electromagnet subassembly associated with a pneumatic switching subassembly with valve plug, which is mechanically associated with the said electromagnet subassembly, the pneumatic switching subassembly being composed of a body enclosing the valve plug trapped between two sealing seats facing each other, the said valve plug movement being forced firstly by a spring located in the mobile core of the electromagnet subassembly through a pusher, and secondly by a means that forces the valve plug onto the upper seating of the pneumatic switching subassembly when the electromagnet is energized.

One of the technical problems that arises during the design of this type of solenoid valve is assembly of the electromagnet subassembly on the pneumatic switching subassembly. In particular, this type of assembly must satisfy the following requirements:

ease of implementation and automation of the assembly;

low cost price;

cannot be disassembled;

possibility of using the assembly on machined parts.

Some of these requirements are contradictory, and particularly the possibility of using the assembly on machined parts, a quality that usually causes cost increases.

The objective of the invention is to provide a solenoid valve that solves all these technical problems and also provides other advantages that will be described below.

BRIEF DESCRIPTION OF INVENTION

The solenoid valve according to this invention is characterised in that its electromagnet subassembly comprises four cylindrical pins at its assembly plane on the pneumatic switching subassembly, each cylindrical pin being provided with a transverse cavity formed on the generating line and terminating with the frustum of a sphere, and in that the pneumatic switching subassembly comprises four cylindrical cavities at its assembly plane with the electromagnet subassembly designed to hold the pins of the electromagnet subassembly, transverse cavities being formed on the body of the pneumatic switching subassembly, these cavities terminating on the corresponding generating line of the cavities into which the pins will be fitted, and the said cavities terminating in the frustum of a sphere such that, after the two subassemblies are assembled together, the transverse cavities of the pins of the electromagnet subassembly are facing the transverse cavities of the said pneumatic switching subassembly, delimiting housings into which a ball will fit.

According to this invention, the diameter of each transverse cavity of the pneumatic switching subassembly is less than the diameter of the balls.

According to another characteristic of the solenoid valve according to the invention, the means that forces the valve plug into contact with the upper seating of the pneumatic switching subassembly is made in the form of an "elastic return" function integrated into the pusher—valve plug.

According to another characteristic of this invention, the solenoid valve comprises a manual control that is composed of a cylindrical-shaped part that firstly moves the valve plug from the lower seating to the upper seating, and secondly makes the pneumatic switching subassembly leak tight by a leak tightness function integrated into this manual control.

According to the invention, the said manual control may be provided with a return means, returning it to the initial position when it is no longer activated, this return means being made in the form of a steel strip spring that is built in at one of its ends to the body of the pneumatic switching subassembly and which at its other end is housed in the retaining groove of the manual control. The end of this strip spring is built into the body of the pneumatic switching subassembly, and is preferably provided with retaining pins.

Other advantages and specificities of this invention will become clear from the following description with reference to the appended drawings, which illustrate example embodiments without being limitative in any way, wherein:

BRIEF DESCRIPTION OF FIGURES

FIGS. 1a and 1b show a front and side elevation respectively of the electromagnet subassembly of the solenoid valve according to the invention;

FIGS. 2a and 2b show a side elevation and a plan view respectively of the pneumatic switching subassembly of the solenoid valve according to the invention;

DETAILED DESCRIPTION OF INVENTION

Figure 3A:
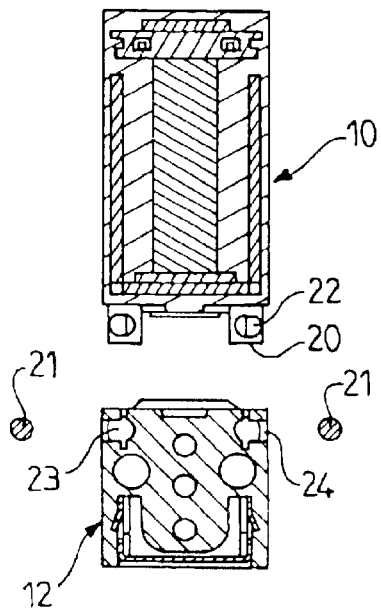
FIGS. 3a to 3c are front elevation views showing the different assembly phases of the electromagnet subassembly on the pneumatic switching subassembly.

With reference to the drawings, it can be seen that the present invention relates to a solenoid valve comprising firstly an electromagnet subassembly denoted as a whole by reference 10, and secondly a pneumatic switching subassembly denoted as a whole by reference 12. The two assemblies 10 and 12 are assembled to each other using other means, and as mentioned above, the invention refers particularly to these means.

The pneumatic switching subassembly 12 is composed of a body enclosing a valve plug 14 made of an elastomer that is trapped between two leak tightness seats 15, 16 facing each other. The movement of the valve plug 14 in the body of the pneumatic switching subassembly is triggered firstly by a spring 17 located in the mobile core 18 of the electromagnet subassembly 10 through a pusher and also by a valve plug return means.

In the rest position, i.e. when the electromagnet is not energised, the spring 17 pushes the mobile core 18 such that it pushes the valve plug 14 into contact onto the seating 16 of the lower channel of the solenoid valve, through its pusher.

When the solenoid valve is in the open position, i.e. when the electromagnet is energised, the magnetic force that it generates in the mobile core 18 is greater than the force of spring 17, and under these conditions, the mobile core comes into contact with the fixed core 19 of the subassembly 10 and it no longer exerts any force on the valve plug 14. The return means of the valve plug 14 then forces the valve plug into contact with the upper seating 15 of the subassembly 12.

The present invention is firstly aimed at a mechanical means of assembling the electromagnet subassembly 10 on the pneumatic switching subassembly 12. An example embodiment of this assembly means is illustrated in FIGS. 1a to 4a.

As can be seen in these figures, the electromagnet subassembly 10 comprises four cylindrical pins 20 at its assembly plane with the mechanical switching subassembly 12, the four pins being designed to hold balls such as balls 21 in transverse cavities 22 formed on the corresponding generating line of the pins, and each finishing at a frustum of a sphere.

At its assembly plane with the electromagnet subassembly 10, the pneumatic switching subassembly 12 comprises four cylindrical cavities 23 designed to hold the pins 20 of the electromagnet subassembly 10. Transverse cavities 24 are formed on the body of the pneumatic switching subassembly 12 and these cavities 24 terminate on a corresponding generating line of the cylindrical cavities 23 in which the pins 20 will fit. Each end of the cavities such as 24 terminates by a frustum of a sphere, the arrangement being such that after one of the two subassemblies 10 and 12 has been pre-assembled, the transverse cavities 22 of the pins 20 are facing the transverse cavities 24 of the pneumatic switching subassembly 12 thus forming a housing for a ball 21.

In order to generate a holding force between the two subassemblies 10 and 12, as would be done for example by a screw assembly according to prior art, the transverse cavities 22 and 24 are offset from each other such that each ball such as 21 in place in its housing will cause a slight deformation of the pins 20, such that the transverse cavities are facing each other.

Figure 3B:
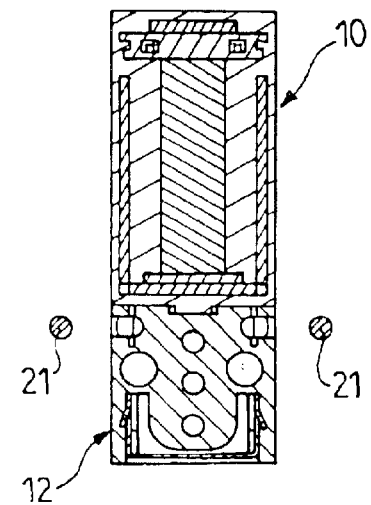
Figure 3C:
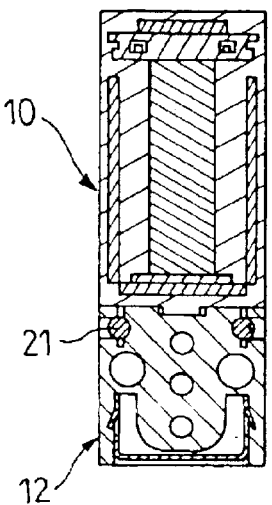
Figure 4:
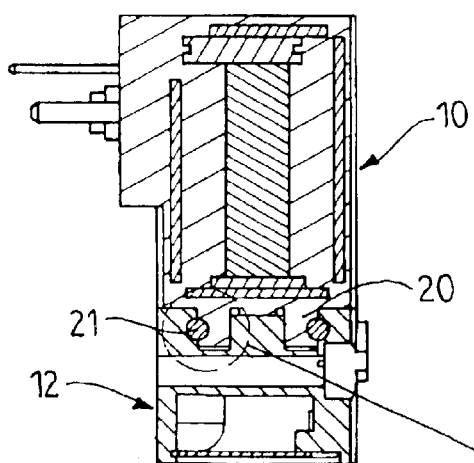
FIG. 4 is a side elevation view of the assembly thus made.
Figure 4A:
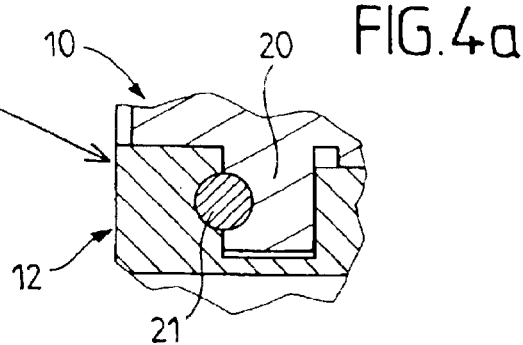
FIG. 4a shows a detail of FIG. 4 at enlarged scale.

FIGS. 3a to 3c illustrate different steps in assembling the assembly 10 with the assembly 12. FIG. 4 shows the assembly after it has been made and the detail in FIG. 4 shows a ball 21 in place in its housing delimited by the transverse cavities 22 of the pins such as 20 and the transverse cavities 24 of the pneumatic switching subassembly 12.

The assembly system thus described is very simple to make and to implement, given that the balls 21 that control locking and that can be made of steel or any other material, do not require any special orientation for their assembly, which prevents the need for very large investments, since this innovative assembly technique is possible simply by pressing. Furthermore, it is very easy to automate the assembly considering the fact that an automatic supply can be provided for the balls such as 21 at low cost.

The fact that the assembly, i.e. the balls 21, cannot be disassembled is achieved according to the invention since each transverse cavity 24 of the pneumatic switching subassembly 12 has a diameter less than the diameter of the balls such as 21, so that it is impossible to disassemble these balls using any type of tool without destroying the solenoid valve.

Due to the shape of the pins 20 and the cavities 23, it is very easy to implement this assembly mode with the machined parts, for example if it is required to use the electromagnet subassembly 10 on a metallic switching subassembly 12.

As mentioned above, this type of solenoid valve contains a return spring means which holds the valve plug on the upper seating 15 of the pneumatic switching subassembly 12 when the solenoid valve is in the open position, i.e. when the electromagnet is energized. In the current state of the art, this return means is made in the form of a spring located under the valve plug and that is in contact around the lower seating of the pneumatic switching subassembly.

The present invention eliminates this spring and replaces its effects by an "elastic return" function integrated into the solenoid valve plug holder. This solution reduces the cost because the spring and the labour necessary to put it into place are eliminated.

FIGS. 5 to 8 illustrate non limitative example embodiments of this elastic spring function.

Figure 5:
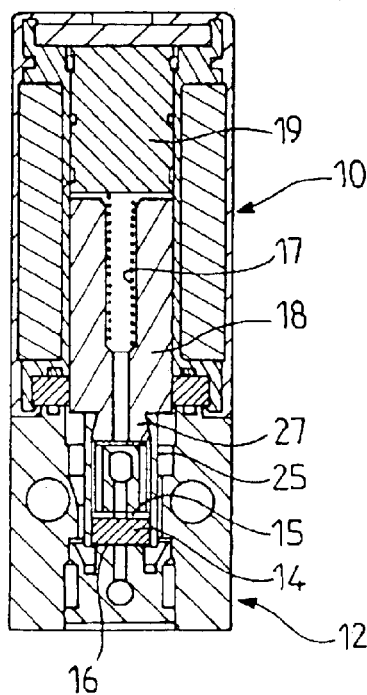
FIG. 5 is a vertical axial sectional view of the solenoid valve according to the invention, illustrating an example embodiment of the elastic connection between the valve plug of the pneumatic switching subassembly and the mobile core of the electromagnet subassembly.
Figure 6:
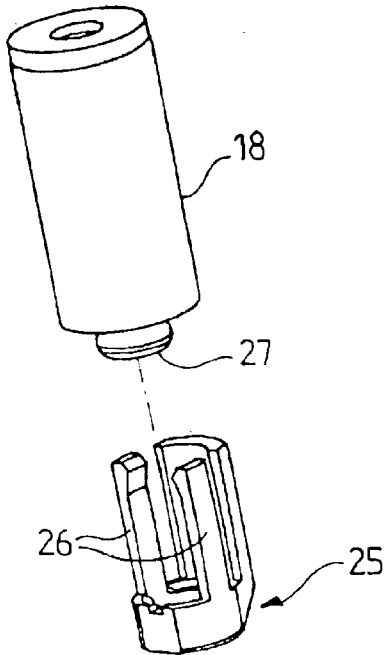
FIG. 6 is a perspective view of the elastic connection used in the solenoid valve illustrated in FIG. 5.

In the embodiment illustrated in FIGS. 5 and 6, the valve plug 14 of the pneumatic switching subassembly 12 is attached to the mobile core 18 of the electromagnet subassembly 12 by elastic coupling to guarantee that when the solenoid valve is opened by energizing the electromagnet subassembly 10, the valve plug 14 actually comes into contact on the upper seating 15 and therefore the seating 16 of the lower channel of the solenoid valve is open, even without any pressure. The elastic return function thus achieved between the mobile core 18 and the valve plug 14 guarantees contact of the valve plug 14 on its upper seating 15 and contact of the mobile core 18 on the fixed core 19 of the electromagnet subassembly 10.

The reason why it is necessary to guarantee contact between the two cores 18 and 19 of the electromagnet subassembly 10 is the limitation in the temperature increase of this subassembly when the subassembly is energised. It is useful to guarantee contact of the valve plug 14 on its upper seating 15 when the electromagnet subassembly 10 is energized, is to guarantee that this upper channel is leak tight.

Thus, as can be seen in FIGS. 5 and 6, this elastic connection is obtained according to this example embodiment of the invention using an attachment part denoted as a whole by reference 25, which forms a valve plug holder and which is provided with tabs such as 26 (FIG. 6) that are attached to a conical shaped projection 27 provided at the end of the mobile core 18 of the electromagnet subassembly 10. Deformation of this valve plug holder 25/core 18 connection also ensures closure of the upper seating 15 when the solenoid valve is open.

Note that the solution described above, which effectively eliminates the spring under the solenoid valve plug according to prior technical art, firstly reduces the number of components in this solenoid valve, and secondly eliminates the manufacturing tolerance on spring forces that generate additional constraints reducing the pneumatic performances of the solenoid valve.

Therefore, this solution has an undeniable economic advantage.

Figure 7:
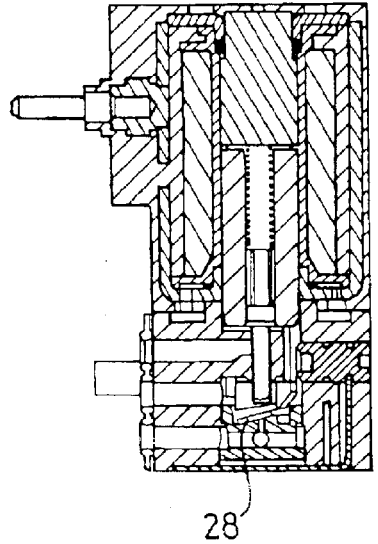
FIG. 7 is a vertical axial sectional view of a solenoid valve comprising another example embodiment of this elastic connection.
Figure 8:
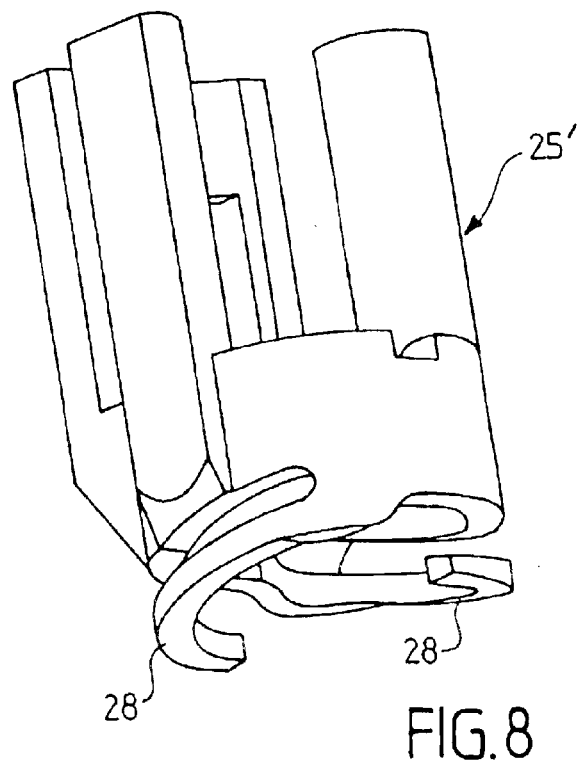
FIG. 8 is a perspective view of the elastic connection used in the solenoid valve illustrated in FIG. 7.

In the second embodiment illustrated in FIGS. 7 and 8, the elastic return function of the valve plug 24 is integrated into the valve plug holder 25'. This is preferably made of a plastic material and it is provided with helical shaped strip springs such as 28 in its lower part, coming into contact on each side of the lower seating of the pneumatic switching subassembly 12. The elasticity of these strip springs is responsible for the elastic return function of the valve plug.

As described above, the solenoid valve is activated by energizing the electromagnet subassembly 10. However, as in prior art, a manual control is provided so that the solenoid valve can be activated without the need for a power supply for this subassembly 10. According to prior art, this manual control is obtained using a part with a cylindrical shape and required to perform two functions:

displacement of the valve plug from the lower seating towards the upper seating, due to a slope formed at the end of the manual control which, when the manual control is activated by a translation movement, transfers a linear movement perpendicular to its translation movement, this perpendicular linear movement being transferred to the valve plug through the valve holder and the mobile core;

a leak tightness function for the pneumatic switching assembly, even while it is being activated.

In solutions used at the present time, the leak tightness function is achieved using an O-ring installed in a groove provided on the manual control. This invention provides a solution for eliminating this O-ring, which reduces cost prices because the O-ring itself is eliminated and the labour necessary to install such an O-ring is eliminated. The solution provided by this invention consists of integrating the leak tightness function into the manual control.

Figures 9, 9A, 10:
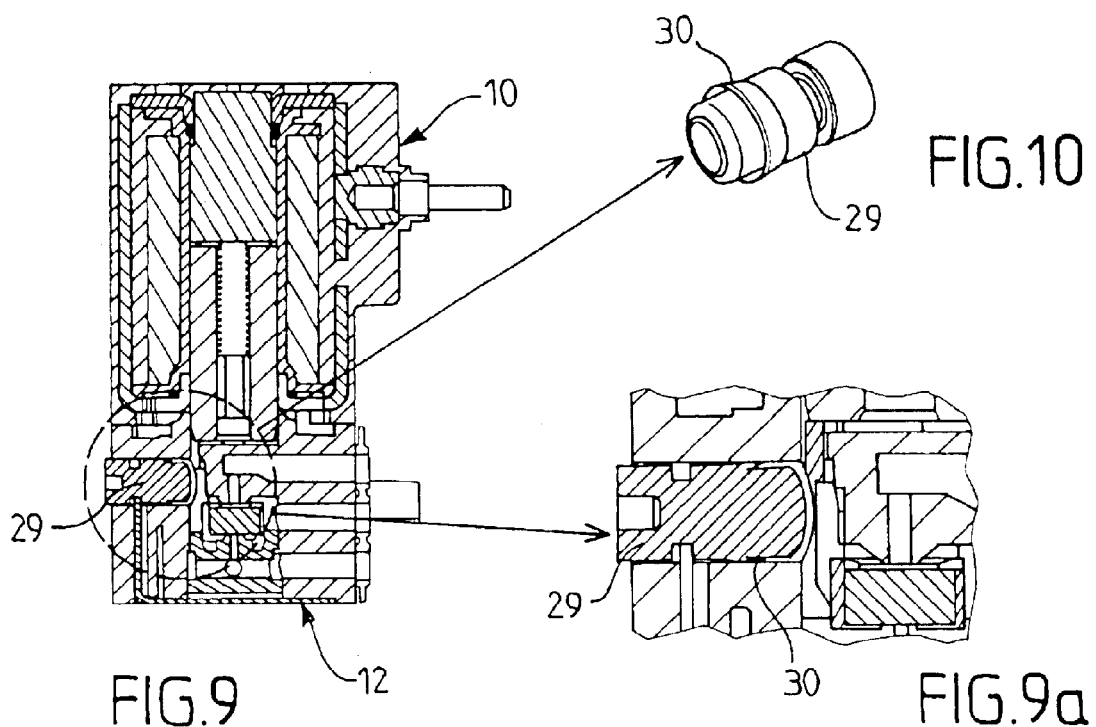
FIG. 9 is a vertical axial sectional view of a solenoid valve fitted with a manual control integrating a leak tightness function.
FIG. 9a shows an enlarged scale of a detail of this manual control according to FIG. 9.
FIG. 10 shows a perspective view of this manual control.

In the example embodiment shown in FIGS. 9 to 10, this leak tightness function is obtained using a lip 30 that is integrated onto the cylindrical part 29 forming the manual control. In order to guarantee good leak tightness, the lip 30 must be sufficiently flexible to match the walls of the housing of the manual control (see FIG. 9a), but sufficiently hard so that it is not crushed when manual control is activated. Preferably, this manual control 29 integrating the lip 30 will be made from an elastomer thermoplastic material.

Figures 11, 11A, 12:
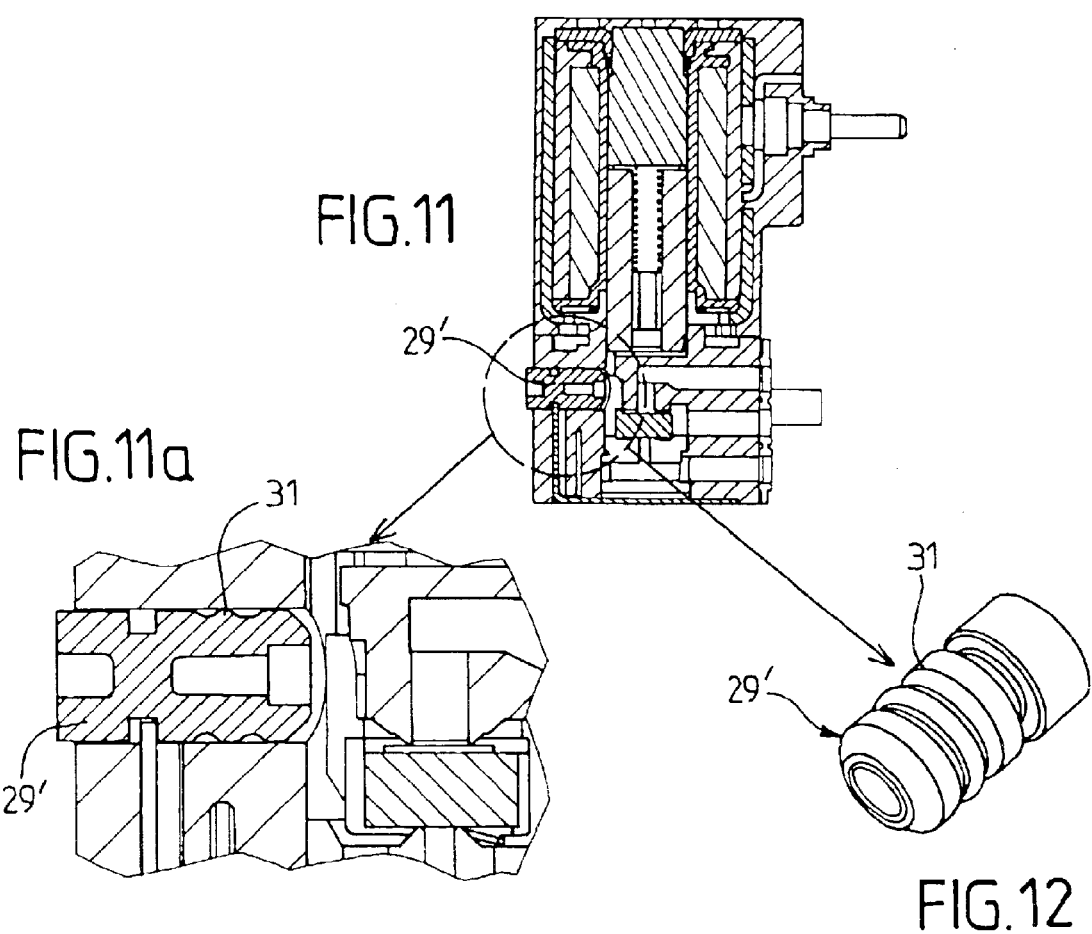
FIG. 11 shows a vertical axial sectional view of a solenoid valve comprising another example embodiment of a manual control integrating a leak tightness function.
FIG. 11a shows an enlarged scale of a detail of this manual control according to FIG. 11.
FIG. 12 shows a perspective view of this manual control.

Another example embodiment of this manual control integrating the leak tightness function is illustrated in FIGS. 11 to 12. In this example embodiment, the integrated leak tightness function is obtained using a torus shape base 31, equivalent to the shape of an O-ring, made around the periphery of the manual control 29'. The material from which the manual control 29' is made must satisfy the same requirements as mentioned above for the manual control 29, and under these conditions it is preferable to make this manual control 29' from an elastomer thermoplastic.

In solenoid valves to which this invention is applicable, means are provided for returning the manual control into its initial position when it is no longer activated. In prior art, these means are made in the form of a spring located at one end of the manual control in order to push this manual control back into its initial position, thus enabling the valve plug in the pneumatic switching assembly to be released from this manual control. The initial position of the manual control is usually obtained by means of an additional part forming a stop, for example a split pin, since the manual control can only be installed in its housing outside the body of the pneumatic switching subassembly. Therefore, the limit stop has to be added after the manual control has been assembled.

The present invention proposes to eliminate the return spring returning the manual control to its initial position and the limit stop for this return spring, these two functions being obtained using a single element. Furthermore, the solution provided by the invention and described below can achieve a spring function that is easier to manipulate or distribute automatically, which reduces costs.

Figure 13:
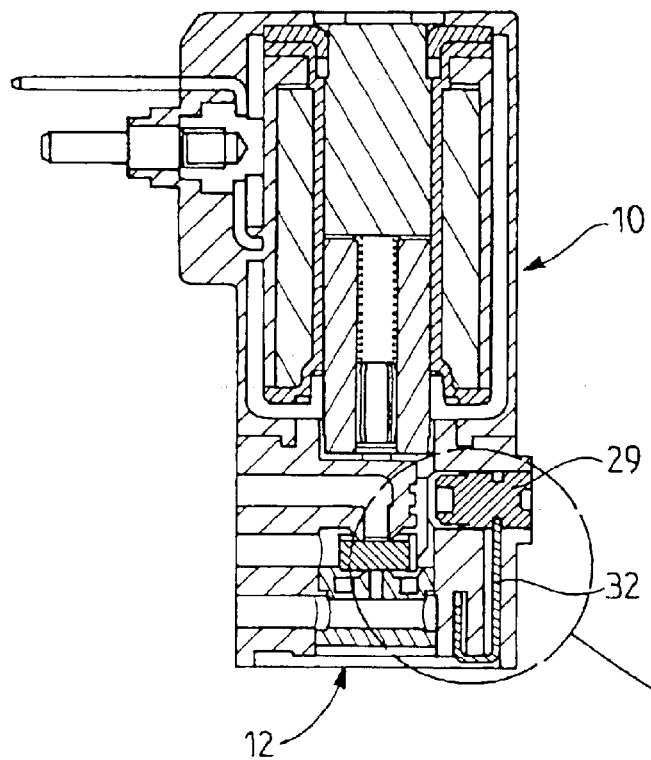
FIG. 13 is a vertical axial sectional view of a solenoid valve in which, according to the invention, the manual control is provided with a return spring made in the form of a steel strip spring.
Figure 14:
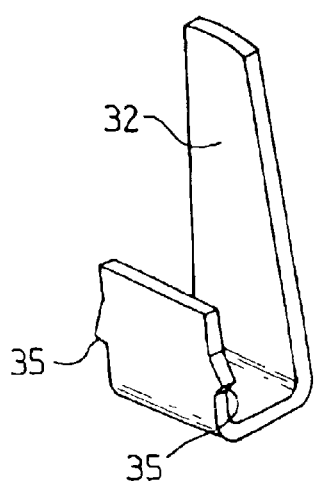
FIG. 14 is a perspective view of the return means used in the solenoid valve shown in FIG. 13.

An example embodiment of this return means for the manual control is illustrated in FIGS. 13 to 14.

As can be seen in these figures, this return means is made in the form of a small strip spring 32. This strip spring has two arms; one is built in at one of its ends into the body of the pneumatic switching subassembly 12, and the other is housed in a retaining groove 33 at its end, formed for this purpose in the manual control 29.

As can be seen in FIG. 4, the end of the steel strip spring 32 built into the pneumatic switching subassembly 12 may be fitted with retaining pins 35.

Furthermore, a cavity 34 is provided under the body of the subassembly 12, under the housing for the manual control 29, into which the steel strip spring 32 fits, while allowing a certain movement in bending, this arrangement being adapted for the reasons described above.

Figure 13A:
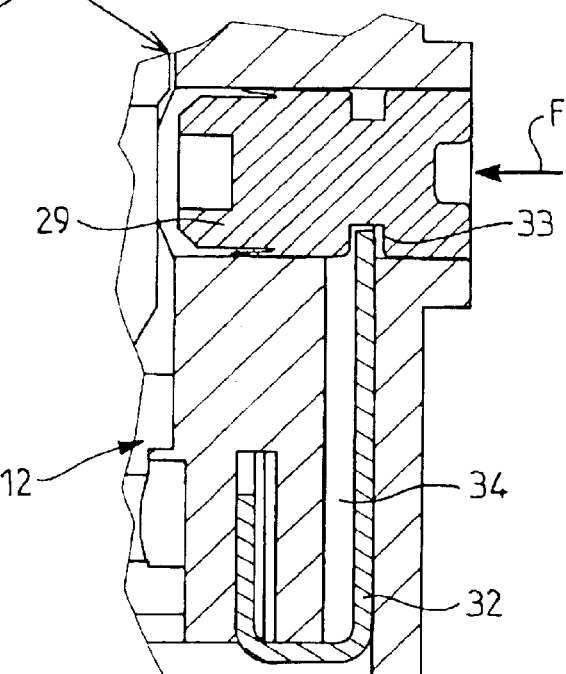
FIG. 13a illustrates a detail of FIG. 13 at larger scale.

In the rest position, i.e. when the manual control 29 is not activated, the steel strip spring 32 stops on the outside face of the cavity 34 (position illustrated in FIG. 13a). When the manual control is activated along the direction shown by arrow F, the steel strip spring 32 is deformed by bending and it applies a movement resisting the displacement along F of the manual control, but this force is much less than the force necessary to activate this manual control. When the manual control is released, the force generated by the steel strip spring brings the manual control back into its rest position, until the steel strip spring 32 returns to limit stop in contact with the outside face of its cavity 34.

Obviously, this invention is not limited to the example embodiments described and represented above, and it includes all variants.

What is claimed is:

1. A solenoid valve comprising an electromagnet subassembly and a pneumatic switching subassembly with a valve plug mechanically associated with the electromagnet subassembly, the pneumatic switching subassembly including a body enclosing the valve plug trapped between two sealing seatings facing each other, the movement of the valve plug being controlled firstly by a spring located in a mobile core of the electromagnet subassembly through a pusher, and secondly by a means that forces the valve plug into contact on the upper seating of the pneumatic switching subassembly when the electromagnet is energized, wherein the electromagnetic subassembly has four cylindrical pins at its assembly plane on the pneumatic switching subassembly, each cylindrical pin being provided with a transverse cavity formed on the generating line of the pin and terminating with a frustum of a sphere, the pneumatic switching subassembly including four cylindrical cavities at its assembly plane with the electromagnet subassembly, designed to hold the pins of the electromagnet subassembly, transverse cavities being formed on the body of the pneumatic switching subassembly, the transverse cavities terminating on the corresponding generating line of the cylindrical cavities into which the pins will be fitted, and the cavities terminating in the frustum of a sphere whereby, after the electromagnetic and pneumatic subassemblies are assembled together, the transverse cavities of the pins of the electromagnet subassembly are facing the transverse cavities of the pneumatic switching subassembly, delimiting housings into which a ball will fit.

2. A solenoid valve according to claim 1, wherein the diameter of each transverse cavity of the pneumatic switching subassembly is less than the diameter of the balls.

3. A solenoid valve according to claim 1, wherein the pins that force the valve plug into contact with the upper seating of the pneumatic switching subassembly is made in the form of an elastic return function integrated into the pusher-valve plug.

4. A solenoid valve according to claim 3, wherein the elastic return function integrated into the pusher-valve plug is made in the form of an attachment part forming a valve plug holder provided with tabs that are attached to a conical projection formed on the end of the mobile core of the electro element subassembly, thus forming an elastic coupling.

5. A solenoid valve according to claim 3, wherein the elastic return function is made in the form of a helical steel strip spring integrated into the valve plug holder that come into contact on each side of the lower seating of the pneumatic switching subassembly.

6. A solenoid valve according to claim 1, together with a manual control comprising: a cylindrical part moving the valve plug from the lower seating towards the upper seating; and leak tightness of the pneumatic switching assembly by a leak tightness function integrated into the said manual control.

7. A solenoid valve according to claim 6, wherein the leak tightness function is obtained by forming a flexible circular lip on a part making up the manual control, this lip matching the shape of the walls of the housing of the manual control.

8. A solenoid valve according to claim 6, wherein the leak tightness function is obtained by providing a torus shape equivalent to the shape of an O-ring, on the cylindrical part forming the manual control.

9. A solenoid valve according to claim 6, wherein the cylindrical part forming the manual control is made from an elastomer thermoplastic material.

10. A solenoid valve according to claim 6, wherein the manual control is provided with a return means for returning the solenoid into an initial position when it is no longer activated, this return means being made in the form of a built in steel strip spring, built in at one of its ends into the body of the pneumatic switching subassembly and at the other end housed in a retaining groove formed in the manual control.

11. A solenoid valve according to claim 10, wherein the steel strip spring comprises two arms, one of the arms being built in at one of its ends into the body of the pneumatic switching subassembly and at the other end being housed in the retaining groove formed in the manual control.

12. A solenoid valve according to claim 11, wherein the end of the arm of the said strip spring built into the body of the pneumatic switching subassembly is provided with retaining pins.

13. A solenoid valve according to claim 11, further comprises a cavity into which one of the arms of the said steel strip spring fits, in the body of the pneumatic switching subassembly and under the manual control housing, enabling movement in bending.

* * * * *